Feb. 6, 1934.　　　　M. ARNETH　　　　1,945,962
APPARATUS FOR AERATING AQUARIUMS
Filed Feb. 24, 1932
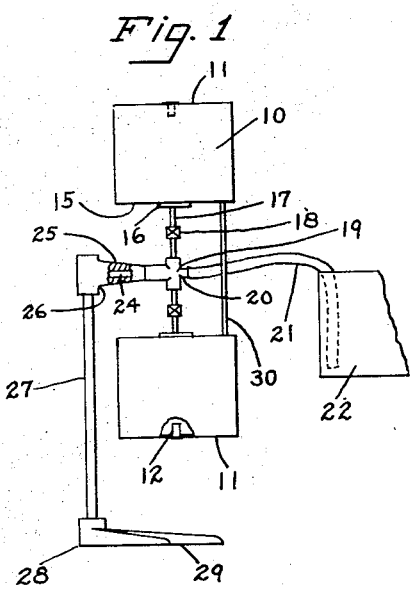
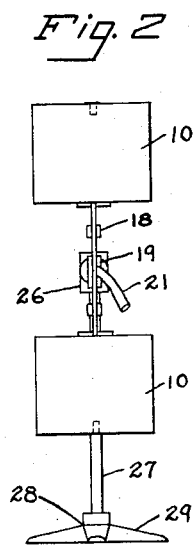
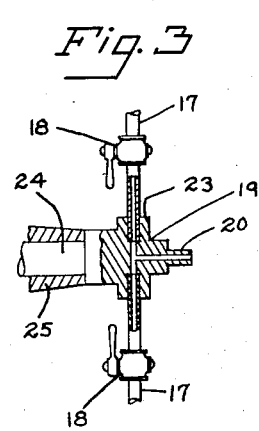
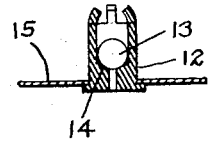
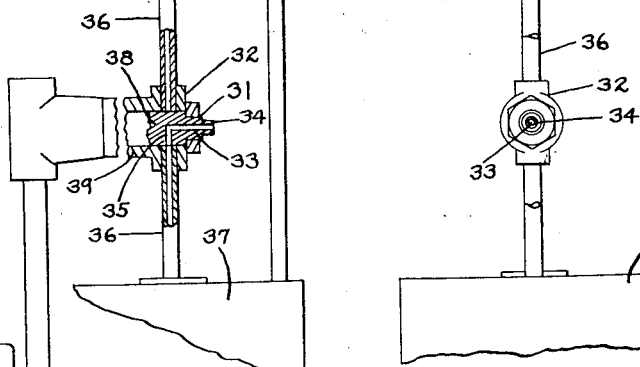
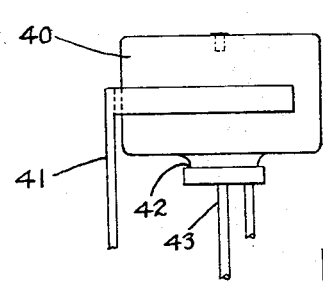
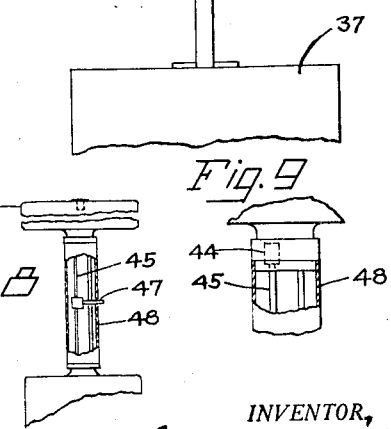
INVENTOR,
Michael Arneth
BY Louis M. Schmidt,
ATTORNEY.

Patented Feb. 6, 1934

1,945,962

UNITED STATES PATENT OFFICE 1,945,962

APPARATUS FOR AERATING AQUARIUMS

Michael Arneth, New Britain, Conn.

Application February 24, 1932. Serial No. 594,976

3 Claims. (Cl. 230—75)

My invention relates to improvements in apparatus for aerating aquariums for use in supplying air thereto through the medium of a rubber tube or the like and the object of my improvement is to produce a method and apparatus for effecting the aeration by apparatus in the form of a structure that can be manipulated by hand, involving occasional attention for maintaining operation, and comprising a symmetrical structure having spaced containers housing a suitable liquid that is retained for repeated use and that operates by gravity to expel air from the container that is in the lowermost position, the manipulation involving a rotation of the moving structure, suitable valve devices being incorporated in the apparatus, including either hand operated valve means, check valves, or a combination of both.

In the accompanying drawing:—

Figure 1 is a front elevation of one form of apparatus that involves the use of my improved method for aerating an aquarium, one end of the tank being also shown.

Fig. 2 is a side elevation of the same.

Fig. 3 shows an enlarged view of the bearing structure.

Fig. 4 shows parts of one of the check valves.

Fig. 5 is a front elevation of a modification.

Fig. 6 is a side view of the same.

Fig. 7 shows another modification, involving the use of glass for the containers.

Fig. 8 is a fragmentary view of another modification in which the valves are restricted to check valves.

Fig. 9 is another view of the same.

My improved apparatus for aerating aquariums involves the use of apparatus that is susceptible of many changes in form. In the form that is shown in Figs. 1, 2, 3, and 4 the containers 10 are made of metal. In substantially all forms the outer wall 11 of the container 10 is provided with a check valve 12 of any proper form, as for instance, a ball 13 that cooperates with a seat 14. Said outer wall 11 is the top wall with the particular container at the upper or top position. In this position the check valve 12 opens so that air will be admitted to the said upper container. The container 10 that is at the bottom under conditions of use receives liquid from the upper container 10, the outer wall 11 thereof constitutes the bottom wall, and the check valve 12 therein closes so as to retain the liquid.

The inner wall 15 of each container 10 corresponds to the top wall of a bottle or the like and is provided with some form of outlet or mouth 16.

In all cases the mouths 16 of the opposed containers 10 communicate respectively with the outer end of an inwardly directed pipe 17. In the form that is now being described each pipe 17 is provided with some form of shut-off valve or cock 18.

The two pipes 17 meet at a centrally located junction structure 19.

The junction structure 19 constitutes the mechanical center in that the axis thereof is the axial line for the bodily rotation of the moving structure that comprises the containers and the connected parts and comprises likewise the centrally located delivery nipple 20 to which is connected the air tubing 21 that delivers the air to the tank 22.

To this end the inner ends of the pipes 17 are connected to a central fixture of some form that so far as concerns the air delivery details is a three-way affair, having two branches that connect respectively with the pipes 17 and a third laterally directed branch that terminates in the form of the nipple 20. The pipe-receiving branches 23 are in vertical alignment and, like the nipple 20, are parts of the junction structure 19.

The junction structure 19 comprises likewise a bearing part, which may be in the form of a laterally projecting stem 24 of rod-like form that is received for operative support and guidance in any suitable form of bearing-socket structure 25 or the like that completes the supporting bearing 26.

The bearing 26, as shown, is supported by means of an upright standard portion 27 of a supporting frame 28 that is provided with a suitable foot-structure 29.

A tube 30 serves to directly connect the inner walls 15 of the two containers 10.

With the upper container charged with water the water will fall into the lower container and tend to displace the air therein for delivery to the aquarium tank with a proper setting of the valves. After the emptying of the upper container the moving structure can be rotated so as to inter-change the containers for resumption of operations; all without recharging for an indefinite period of time. With a few quarts of water for the charge the apparatus is adapted to maintain continuous operation in delivering air to the tank for a few hours.

Under operating conditions the tube 30 receives water from the upper container and delivers the same to the upper end of the lower container and above the water line therein. This tube is in the form of a single straight continuously open structure, being free of any and all forms of valves or cocks or the like.

By opening into what may be described as the air end of the lower container there is involved a minimum of hydraulic pressure effect. The water received falls through the air space in the lower container and is deposited at the bottom portion thereof, virtually at the water line, which water line gradually rises. The air in the lower container is thus displaced and is guided by the air delivery means to the tank.

The water delivery lacks anything suggestive of forced ejection, the air being merely displaced by the deposited water.

By the use of the single valveless tube 30 there is eliminated any and all need of special parts and special manipulation of the air displacement detail in changing the containers around between the alternative positions, or reversing the containers.

For the reasons given, the device is especially adapted for use in connection with aquariums of household form or small sized goldfish tanks or the like.

In the modification of Figs. 5 and 6 the control valves 18 are omitted and in lieu thereof a two-way valve 31 is incorporated in the junction structure 32; the interior passages of the valve comprising a laterally directed branch 33 that opens through the nipple 34 and a downwardly directed branch 35; said downwardly directed branch 35 under operating conditions being in registration with the pipe 36 that is in the lowermost position and connected with the container 37 that is in the lower air delivering location; the other upper pipe 36 being shut-off.

Another important detail of this form of structure is the utilization of a centrally positioned plug 38 for providing the two-way passage that is composed of the branches 33 and 35 and likewise utilization of this same plug 38 as the axle about which the moving structure as a whole rotates. Said plug 38 is enclosed by a hub-like structure 39 to which the pipes 36 are connected.

By this arrangement hand manipulation of the valves is avoided, the valve operation being entirely automatic.

The use of glass for the containers 40 permits of making an attractive structure by the use of liquid that is colored as desired. Such use involves changes in mechanical details. One of these is the addition of some form of interconnecting frame structure 41. Also, there would be packed joints 42 for the pipes 43.

In the form shown in Figs. 8 and 9 the basic structure corresponds to that shown in Figs. 1, 2, 3, and 4 in that a valve 44 is incorporated in each of the tubular or pipe connections 45 that project inwardly respectively from the containers 46 and serve as air conductors for the delivery of air to the nipple 47. The difference lies in the fact that the valves 44 are check valves and are adapted to operate automatically. Also, the containers 46, as shown are of glass.

The pipe connections 45 and associated parts may be generally enclosed by a generally tubular housing 48 that is also adapted to serve as a handle or grip to be engaged by the hand for rotating the movable structure.

The aquarium tank 22 shown diagrammatically is of the form that is used in households and that may have as its inhabitants goldfish, other fish of diminutive kinds, turtles, and other water denizens.

The apparatus shown and described operates to aerate the water in such aquariums in an efficient manner. This result involves avoidance of a stream or jet of air under pressure conditions. That is to say, pressure that is perceptible or noticeable. A stream of air delivered under appreciable pressure is damaging to the living creatures in the tank.

Efficiency likewise involves avoidance of waste, meaning waste of air.

Avoiding an air jet or stream is effected by making the air delivery in the form of bubbles of air, delivered intermittently. Bubbles form at the end of the delivery tube, break away, and float upwardly. If small, these bubbles will be retained in the water. If large, they will rise all of the way to the top and there burst and the air will escape into the atmosphere instead of being retained by the liquid.

I claim as my invention:—

1. In apparatus for aerating aquariums, an upper and a lower container connected for discharge of liquid from the upper to the lower for the displacement of air from the latter, and delivery control means for such displaced air comprising a cock structure that is provided with a delivery passage that is made up of two connected branches, the one directed outwardly for the delivery proper and the other for connection with the lower container for receiving the displaced air, means for fixedly supporting said cock structure so as to be adapted to serve as a bearing, a cock housing rotatably mounted on said cock structure and mechanically connected to said containers so as to rotate therewith as a unit, and said housing being provided with diametrally opposed passages for being alternately brought into registration with said other branch passage responsive to rotation of said unit for effecting such connection with the lower container.

2. In apparatus for aerating aquariums for household use, a pair of containers adapted for alternate use as upper and lower for the delivery of water from the upper to the lower for displacement of air from the lower, first valve means for admitting replacement air in the upper container, second valve means for controlling such displacement of air, conductor means for effecting such delivery of water, and said conductor means being in the form of a single fully and continuously open tube that terminates by its ends on the inside of the nearest opposed walls of the two containers.

3. In apparatus for aerating aquariums, a pair of containers for alternate use as upper and lower for the displacement of air in the lower by water received therein from the upper, a valve for admitting displacement air in the upper container, air delivery means connected to both containers with valves providing connection with the lower container and shutting-off the upper container, a conductor for receiving water from the upper container for delivery to the lower, and said conductor having its delivery opening located above the water line in the lower container.

MICHAEL ARNETH.